(12) United States Patent
Singh et al.

(10) Patent No.: US 10,215,008 B2
(45) Date of Patent: Feb. 26, 2019

(54) POLYMERIC METAL CROSSLINKER FOR SHEAR TOLERANT FRACTURING FLUID APPLICATION

(71) Applicant: HALLIBURTON ENERGY SERVICES, INC., Houston, TX (US)

(72) Inventors: Dipti Singh, Kingwood, TX (US); Jim D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/504,611

(22) PCT Filed: Sep. 24, 2014

(86) PCT No.: PCT/US2014/057298
§ 371 (c)(1),
(2) Date: Feb. 16, 2017

(87) PCT Pub. No.: WO2016/048312
PCT Pub. Date: Mar. 31, 2016

(65) Prior Publication Data
US 2017/0233641 A1 Aug. 17, 2017

(51) Int. Cl.
*E21B 43/26* (2006.01)
*C09K 8/68* (2006.01)
(Continued)

(52) U.S. Cl.
CPC .......... *E21B 43/26* (2013.01); *C09K 8/10* (2013.01); *C09K 8/12* (2013.01); *C09K 8/685* (2013.01); *C09K 8/725* (2013.01); *C09K 8/887* (2013.01); *C09K 8/90* (2013.01); *E21B 43/267* (2013.01); *C09K 2208/24* (2013.01); *C09K 2208/26* (2013.01); *E21B 21/00* (2013.01); *E21B 43/04* (2013.01)

(58) Field of Classification Search
None
See application file for complete search history.

(56) References Cited

U.S. PATENT DOCUMENTS 3,010,985 A  11/1961  Ramsden
3,727,687 A   4/1973  Clampitt et al.
(Continued)

FOREIGN PATENT DOCUMENTS

WO    2013/036350    8/2012

OTHER PUBLICATIONS

PCT International Search Report and Written Opinion, dated Jun. 5, 2015, Appl No. PCT/US2014/057298, "Polymeric Metal Crosslinker for Shear Tolerant Fracturing Fluid Application, " filed Sep. 24, 2014, 12 pgs.

*Primary Examiner* — Anuradha Ahuja
(74) *Attorney, Agent, or Firm* — Thomas Rooney; Corey Tumey

(57) ABSTRACT

A method of treating a subterranean formation includes introducing a viscosified treatment fluid into a subterranean formation, the treatment fluid including an aqueous fluid, a gelling agent, and a crosslinker including a copolymer with an interpenetrating monomer and organic bound metal ions. A composition includes an aqueous fluid, a gelling agent; and a crosslinker including a copolymer with an interpenetrating monomer and organic bound metal ions.

15 Claims, 5 Drawing Sheets

(51) Int. Cl.
*C09K 8/10* (2006.01)
*C09K 8/90* (2006.01)
*C09K 8/72* (2006.01)
*C09K 8/88* (2006.01)
*C09K 8/12* (2006.01)
*E21B 43/267* (2006.01)
*E21B 21/00* (2006.01)
*E21B 43/04* (2006.01)

(56) References Cited

U.S. PATENT DOCUMENTS

| | | | | |
|---|---|---|---|---|
| 4,137,182 A * | 1/1979 | Golinkin | ............ | C09K 8/685 166/283 |
| 4,432,881 A * | 2/1984 | Evani | ............ | C08L 57/00 166/275 |
| 4,541,935 A * | 9/1985 | Constien | ............ | C09K 8/62 166/308.2 |
| 4,579,670 A * | 4/1986 | Payne | ............ | C09K 8/685 166/308.5 |
| 4,844,168 A | 7/1989 | Sydansk | | |
| 5,002,125 A * | 3/1991 | Phillips | ............ | E21B 43/26 166/271 |
| 5,036,919 A * | 8/1991 | Thomas | ............ | C09K 8/685 166/271 |
| 5,062,969 A * | 11/1991 | Holtmyer | ............ | C08F 220/06 507/203 |
| 5,133,408 A | 7/1992 | Tackett | | |
| 6,488,091 B1 | 12/2002 | Weaver et al. | | |
| 7,082,995 B2 | 8/2006 | Hanes et al. | | |
| 8,129,317 B2 | 3/2012 | Kriegel et al. | | |
| 8,669,214 B2 | 3/2014 | Moradi-Araghi et al. | | |
| 2007/0281869 A1* | 12/2007 | Drochon | ............ | C09K 8/602 507/219 |
| 2007/0289519 A1* | 12/2007 | Collins | ............ | B63C 7/10 114/256 |
| 2010/0022419 A1* | 1/2010 | Reed | ............ | C09K 8/5083 507/221 |
| 2010/0130388 A1 | 5/2010 | Phatak et al. | | |
| 2011/0048716 A1* | 3/2011 | Ezell | ............ | C09K 8/12 166/300 |
| 2011/0048718 A1* | 3/2011 | Van Zanten | ............ | C09K 8/12 166/305.1 |
| 2011/0092397 A1* | 4/2011 | Armstrong | ............ | C09K 8/685 507/201 |
| 2012/0000659 A1* | 1/2012 | Loveless | ............ | C09K 8/12 166/305.1 |
| 2012/0101229 A1* | 4/2012 | Aalaie Haradasht | ............ | C08J 3/246 525/54.2 |
| 2012/0130036 A1* | 5/2012 | Ulmer | ............ | A61K 8/817 526/210 |
| 2012/0132422 A1* | 5/2012 | Mirakyan | ............ | C09K 8/52 166/279 |
| 2014/0158355 A1* | 6/2014 | Wuthrich | ............ | C09K 8/588 166/294 |
| 2014/0221256 A1* | 8/2014 | Holtsclaw | ............ | C08L 33/14 507/211 |
| 2014/0332214 A1* | 11/2014 | Zhou | ............ | E21B 43/267 166/280.2 |

\* cited by examiner

POLYMERIC METAL CROSSLINKER FOR SHEAR TOLERANT FRACTURING FLUID APPLICATION

BACKGROUND

The present invention relates to methods and compositions for increasing the viscosity of a treatment fluid, and, more specifically, to methods and compositions for treating a subterranean formation using a viscosified treatment fluid that contains a polymeric metal crosslinking agent.

Many industrial applications, including those in the upstream energy industry, utilize viscosified fluids or "viscosified treatment fluids." As used herein, the terms "treatment" or "treating" refer to any subterranean operation that uses a fluid in conjunction with achieving a desired function and/or for a desired purpose. The terms "treatment" and "treating," as used herein, do not imply any particular action by the fluid or any particular component thereof. Treatment fluids can include, for example, drilling fluids, fracturing fluids, gravel packing fluids, acidizing fluids, conformance treatment fluids, damage control fluids, remediation fluids, scale removal and inhibition fluids, chemical floods, and the like. Generally, viscosified treatment fluids that are used in subterranean operations are aqueous-based fluids that comprise gelling agents. These gelling agents can be biopolymers or synthetic polymers. Common gelling agents that can be used in viscosified treatment fluids can include, for example, galactomannan gums, cellulosic polymers, and polysaccharides.

Most viscosified treatment fluids crosslink the gelling agent using a crosslinking agent to increase the fluid's viscosity. Common crosslinking agents can comprise a metal ion, a transition metal, or a metalloid, which are collectively referred to herein as "metal(s)." Illustrative metals suitable for crosslinking can include, for example, aluminum, antimony, zirconium, magnesium and titanium, chromium. Generally, the metal of a crosslinking agent can interact with at least two gelling agent molecules to form a crosslink between them, thereby forming a crosslinked gelling agent.

Although conventional metal crosslinking agents can frequently be used in viscosified treatment fluids, the use of such crosslinking agents can be problematic because they may not form a viscoelastic gel below a critical concentration of gelling agent (e.g., the critical overlap concentration C*). In addition, such viscosified treatment fluids may not be thermally stable at high temperatures (e.g., temperatures exceeding about 300° F.), such that a loss of viscosity occurs over time. To offset these types of viscosity losses, the concentration of the gelling agent and/or the crosslinking agent can be increased, albeit at an increased cost of goods. Also, these viscosified treatment fluids may lack shear tolerance. Further, higher concentrations of the gelling agent and/or the crosslinking agent can make the viscosified treatment fluid more difficult to remove from a subterranean formation.

Accordingly, an ongoing need exists for methods of crosslinking gelling agents that lowers the required metal concentration and improves the shear sensitivity of the treatment fluid.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
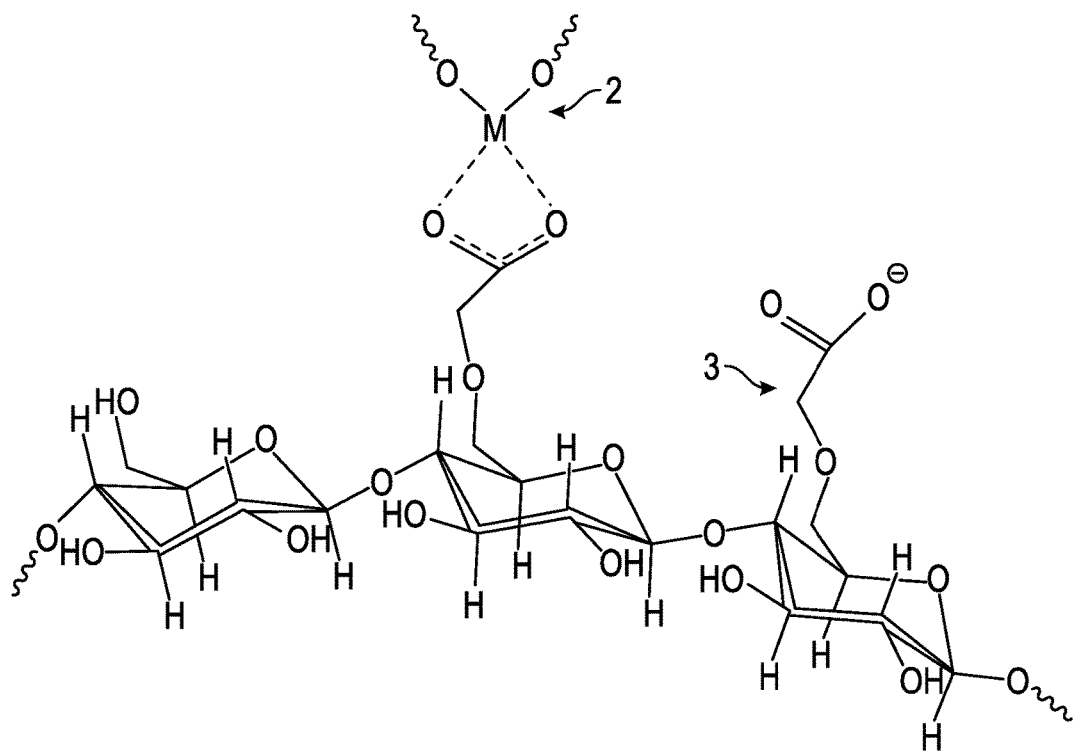
FIG. 1 depicts a carboxymethyl cellulose with a metal linker according to the prior art.

The present invention relates to methods and compositions for increasing the viscosity of a treatment fluid, and, more specifically, to methods and compositions for treating a subterranean formation using a viscosified treatment fluid that contains an interpenetrating polymer crosslinking agent.

The methods and compositions of the present invention are useful in a variety of applications in which it is desirable to increase the viscosity of a fluid. Examples include, but are not limited to, treatment fluids used in subterranean operations (e.g., drilling fluids, fracturing fluids, gravel packing fluids and viscous sweeps). Although many of the embodiments of the present invention will be discussed in the context of subterranean operations, such discussion is only intended to illustrate some applications of the interpenetrating polymer crosslinking agents of the present invention and should not be considered limiting.

In some embodiments, the invention is related to a method of treating a subterranean formation, comprising: introducing a viscosified treatment fluid into a subterranean formation, said treatment fluid comprising: an aqueous fluid; a gelling agent; and a crosslinker comprising a copolymer including an interpenetrating monomer and organic bound metal ions. The crosslinker may comprise reactive metal ion sites bound to the interpenetrating monomer through direct organic bonds. The crosslinker may be a copolymer synthesized from at least one monomer including a vinyl group, and a reactive organometallic monomer. The monomer may be at least one selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof. The gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof. The reactive organometallic monomer may comprise at least one metal-carbon bond and one reactive group. The crosslinker copolymer may be prepared by polymerization of a reactive organometallic monomer capable of polymerizing with at least one monomer selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof. The amount of crosslinker may be in the range of about 0.05 pounds per thousand gallons of treatment fluid to about 85 pounds per thousand gallons of treatment fluid. The crosslinker may be encapsulated to delay the release of the crosslinker. The method of treating the formation may further comprise shearing the viscosified treatment fluid; allowing the viscosity of the fluid to decrease; and re-crosslinking the fluid to increase the viscosity of the treatment fluid.

Several embodiment of the invention are directed to a method of treating a subterranean formation, comprising: introducing a treatment fluid into a subterranean formation at a pressure sufficient to create or enhance at least one fracture within the subterranean formation, said treatment fluid comprising: an aqueous fluid; a gelling agent; and a crosslinker comprising a copolymer including an interpenetrating monomer and organic bound metal ions. The method may further comprise contacting the treatment fluid with a breaker; and allowing the viscosity of the fluid to decrease. The treatment fluid may further comprise a proppant particulate.

Certain embodiments of the invention are directed to a composition comprising: an aqueous fluid; a gelling agent; and a crosslinker comprising a copolymer including an interpenetrating monomer and organic bound metal ions. The crosslinker copolymer may be synthesized from at least one monomer and a reactive organometallic monomer. The gelling agent may be present in the treatment fluid in the range of from about 0.1% to about 10% by weight of the aqueous fluid.

Some embodiments of the invention may be directed to a well treatment system comprising: an apparatus configured to introduce a treatment fluid into a subterranean formation at a pressure sufficient to create or enhance at least one fracture within the subterranean formation, said treatment fluid comprising: an aqueous fluid; a gelling agent; and a crosslinker comprising a copolymer including an interpenetrating monomer with organic bound metal ions; introducing the treatment fluid into the subterranean formation; and creating or enhancing at least one fracture within the subterranean formation.

Aqueous Base Fluids

The aqueous base fluid of the present embodiments can generally be from any source, provided that the fluids do not contain components that might adversely affect the stability and/or performance of the treatment fluids of the present invention. The aqueous carrier fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

The aqueous base fluid may be present in the treatment fluid in the amount of from about 85% to about 98% by volume of the treatment fluid, about 90% to about 98%, or about 94% to about 98%.

Gelling Agents

A variety of gelling agents may be used in the treatment fluids of the present invention. Suitable gelling agents typically may comprise biopolymers, synthetic polymers, or both. Without wishing to be limited by any particular theory, it is believed that in certain embodiments, a reactive metal ion group in an interpenetrating polymer crosslinking agent may form a crosslink with suitably oriented hydroxyl groups on a gelling agent molecule to form a viscosified treatment fluid.

In some embodiments, suitable gelling agents may be biopolymers comprising polysaccharides, and derivatives thereof, including those that have one or more of the following monosaccharide units: galactose, mannose, glucoside, glucose, xylose, arabinose, fructose, glucuronic acid, or pyranosyl sulfate. Examples of suitable biopolymers may include, but are not limited to, guar, guar gum and derivatives thereof (e.g., hydroxypropyl guar and carboxymethylhydroxypropyl guar), cellulose and cellulose derivatives (e.g., carboxymethyl cellulose, carboxymethyl cellulose, and hydroxyethyl cellulose), and xanthan and derivatives thereof.

In some embodiments, the gelling agent, particularly a biopolymer, may be at least partially depolymerized. The term "depolymerized," as used herein, generally refers to a decrease in the molecular weight of the gelling agent molecule by removal of at least some of its monomer units. Depolymerized gelling agent molecules are described in U.S. Pat. No. 6,488,091.

In some embodiments, the gelling agent may comprise a water-soluble synthetic polymer. In some embodiments, the gelling agent may be a synthetic polymer containing hydroxyl groups such as, for example, polyvinyl alcohol. Synthetic polymers may be prepared by any suitable monomers known in the art, including those useful for forming the interpenetrating polymer crosslinking agents. In some embodiments, suitable monomers useful in forming a synthetic polymer useful as a gelling agent may include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, sulfonic acid, vinyl phosphonic acid, vinylbenzene sulfonic acid, methacrylic acid, vinyl caprolactam, N-vinylformamide, diallyl amine, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid, alkyl acrylates, alkyl methacrylates, alkyl acrylamides, alkyl methacrylamides alkyl dimethylammoniumethyl methacrylate halides, and alkyl dimethylammoniumpropyl methacrylamide halides. In some embodiments, these monomers and others can be copolymerized with monomers that contain hydroxyl groups suitable for crosslinking with an interpenetrating polymer crosslinking agent. Illustrative synthetic polymers that can include the foregoing water-soluble monomers include, but are not limited to, polyacrylates, polymethacrylates, polyacrylamides, polyvinyl alcohol, polyvinylpyrrolidone, and their copolymers.

In certain embodiments, the gelling agent may be present in a treatment fluid in an amount ranging from about 0.1% to about 10% by weight of the aqueous fluid therein. In certain embodiments, the gelling agent may be present in the treatment fluid in an amount ranging from about 0.2% to about 4% by weight of the aqueous fluid therein.

Adjusting the properties of the gels may be accomplished in several ways including the degree of substitution in the gels. For example, for CMC, the degrees of carboxylate substitution may range from about 0.3 up to a degree of substitution of about 3.0. Techniques for adjusting the properties of gels are described in U.S. Pat. No. 3,727,687. In general, a. CMC having lower degree of substitution may have less uniform properties. A CMC having a higher degree of substitution may have a lower viscosity.

Interpenetrating Polymer Crosslinking Agent

The treatment fluids of the present invention may also include a crosslinker comprising an interpenetrating polymer and organic bound metal ions. This crosslinker may be used to form an interpenetrating polymer network.

Figure 2:
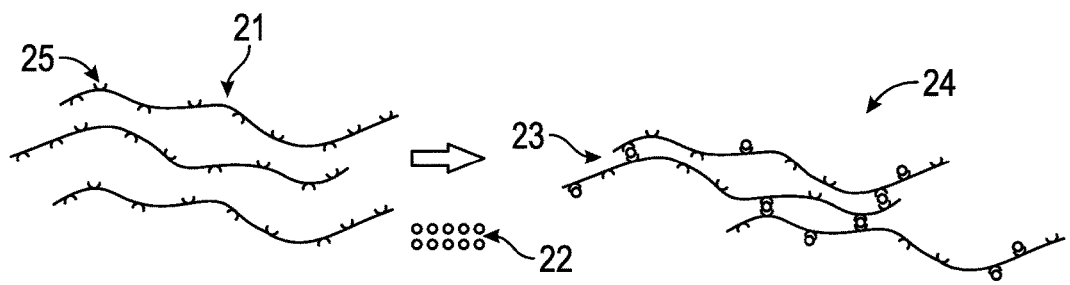
FIG. 2 depicts the crosslinking process using the small metal ion crosslinkers of the prior art.

An interpenetrating polymer network means a combination of two different polymers which are not connected to each other by covalent bonds, but which interact with each other instead by other means, owing to the close physical proximity of the two different polymers in the particles. These other means of interaction might include physical entanglements, ionic interactions, or hydrogen-bonding interactions, either alone or in combination. FIG. 1 demonstrates the way a traditional metal linker 2 attaches to the carboxyl group 3 of carboxymethyl cellulose (CMC). FIG. 2 illustrates using these traditional small metal ion crosslinkers, which include sockets 21 on the backbone 25 of the polymer chain representing the linkable carboxy groups in polymer chains such as CMC. The crosslinker 22 is represented by metal ion linkers such as aluminum, zirconium, and titanium and the like. Once mixed, the linkers 22 bind the polymer chains together 23 at the sockets 22 to form a three dimensional network 24. In order to accomplish the linking, the polymer chains may need to be in very close proximity.

Figure 3:
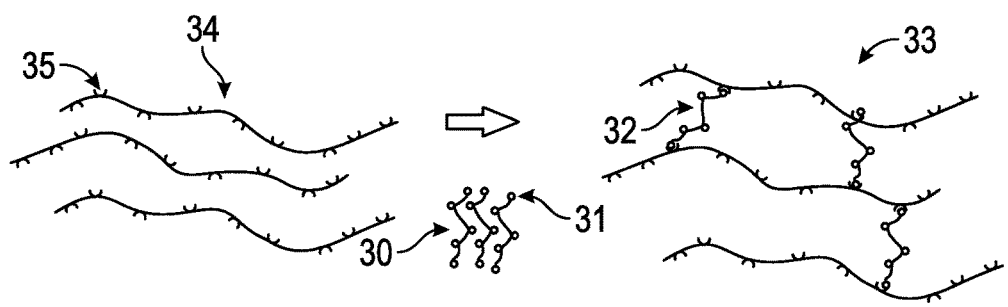
FIG. 3 depicts the crosslinking process using interpenetrating polymers according to several embodiments of the invention.

In certain embodiments as illustrated in FIG. 3, the invention includes sockets 35 on the backbone 34 of a polymer chain and a second polymer 30 that contains organically bound metal ions 31 to link 32 the linkable carboxyl groups in the polymer chains into a network 33. Because the metal 31 may be organically bound to a polymer 30 that may interpenetrate with the polymer chains, multiple rheological benefits of crosslinking may be achieved. One benefit is that the polymer chains with linkable carboxyl groups are not forced into close proximity to achieve network formation or gelation. Another benefit is that a superior gel network may be formed at lower polymer chain concentrations.

Figure 4:
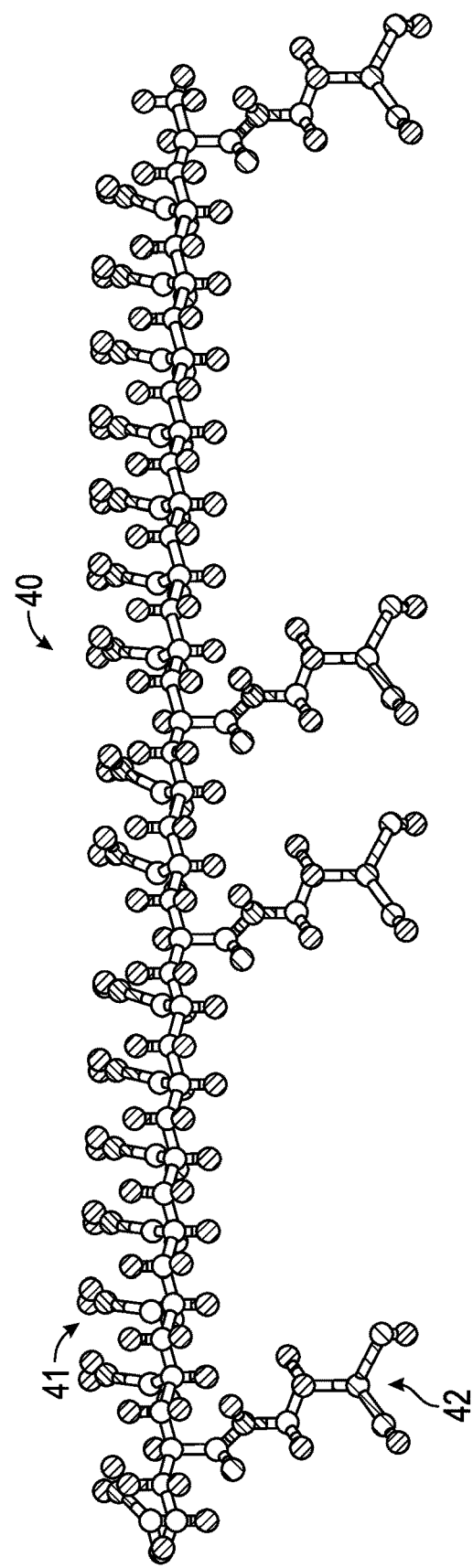
FIG. 4 depicts a molecular structure of an interpenetrating polymer according to several embodiments of the invention.

Embodiments of the invention may contain any polymer with is capable of interpenetrating with carboxylated polysaccharides, such as CMC or CMG, and contains reactive metal ion sites which are bound through direct organic bonds. FIG. 4 is an illustrative molecular structure of a compound 40 that may be used according to the invention. The polyacrylamide backbone polymer 41 with pendent organoaluminum groups 42 that may react with carboxyl groups contained on a CMC or CMG polymer has several advantages. First, it is water soluble. Second, it interpenetrates with CMG. Third, because it is based on polyacrylamide, it may lower friction pressure and provide reaction with the CMG, thereby resulting in crosslinking. Fourth, this interpenetrating polymer may reduce the amount of CMC required to form stable gels.

Figure 5A:
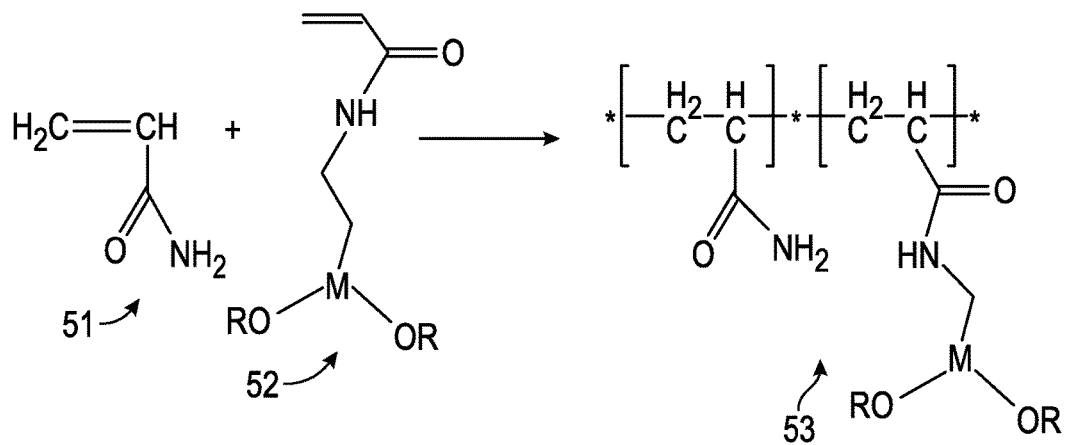
FIGS. 5A,B,C are examples of the copolymerization process of acrylamide with a reactive organometallic monomer and useful monomers.
Figure 5B:
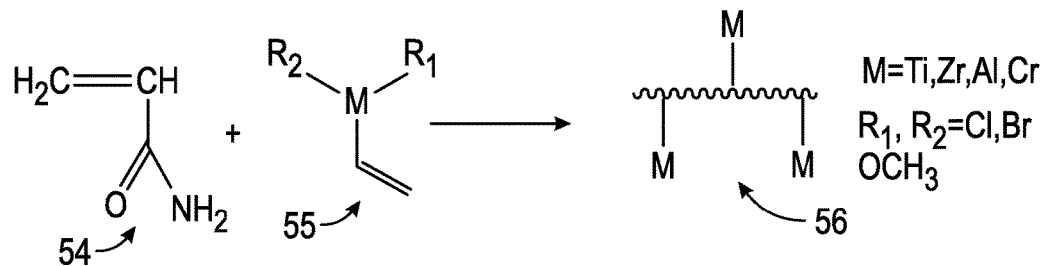
Figure 5C:
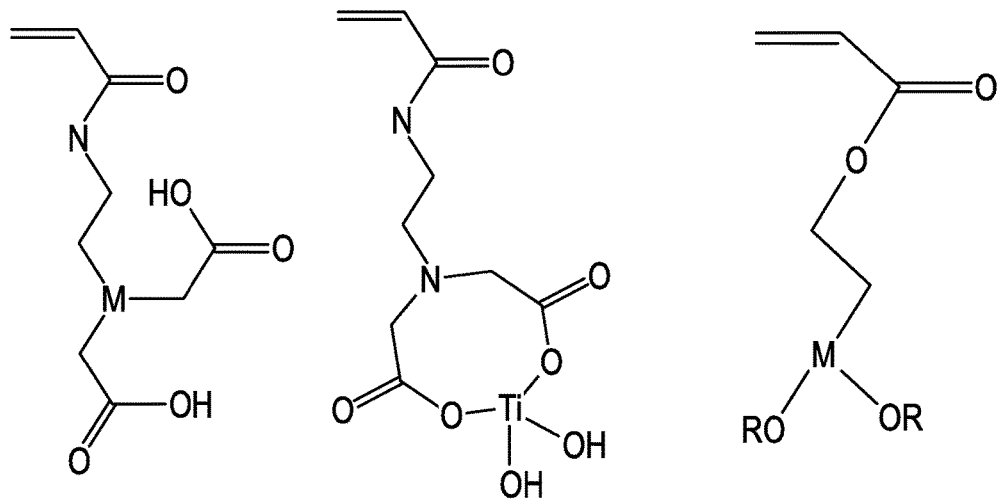

The interpenetrating polymers of the present invention may be synthesized by copolymerizing any polymer that is capable of interpenetrating a carboxylated polysaccharide with a reactive organometallic monomer. In an exemplary example as illustrated in FIG. 5A, acrylamide 51 and a reactive organometallic monomer 52 are combined through free radical polymerization to form a polymeric metal crosslinker 53. FIG. 5B illustrates an alternative path for synthesis of the polymeric metal crosslinker where acrylamide 54 and a reactive organometallic monomer 55 are combined to form a polymeric metal crosslinker 56. FIG. 5C illustrates examples of monomers that may be used in the copolymerization to produce the interpenetrating polymers of the invention.

Figure 6:
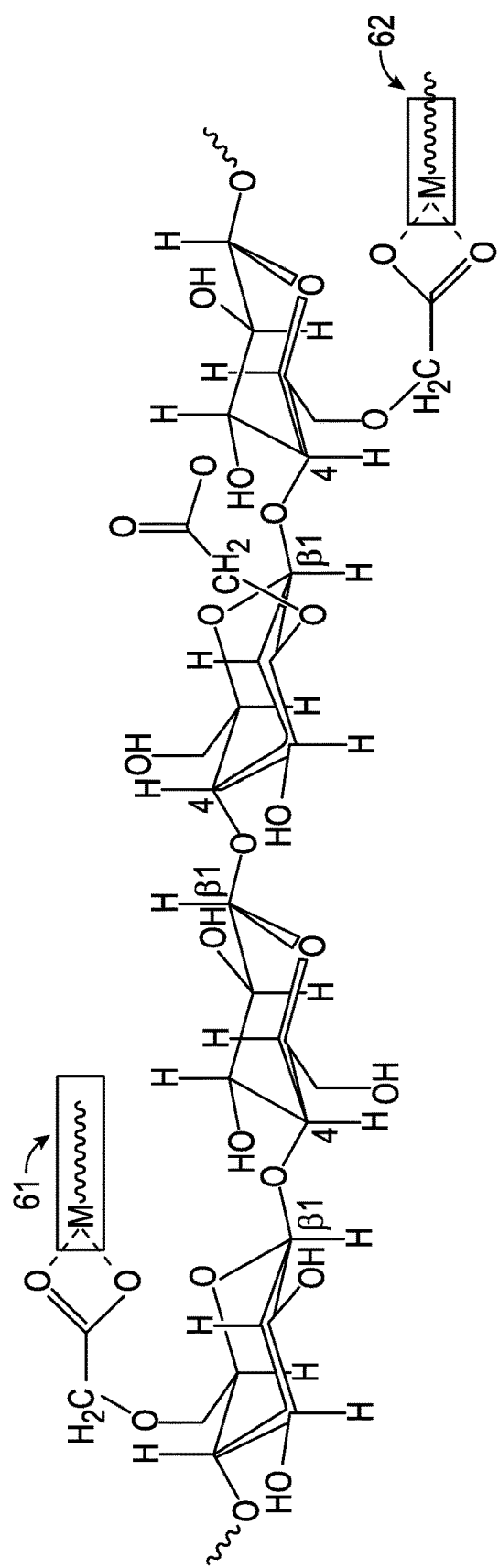
FIG. 6 depicts the crosslinking of carboxymethyl cellulose using a polymeric metal crosslinker according to the invention.

FIG. 6 illustrates the results of crosslinking carboxymethyl cellulose using the interpenetrating copolymer metal crosslinkers 61, 62 of the invention. These polymers may have a more general structure as shown in Formula 1:

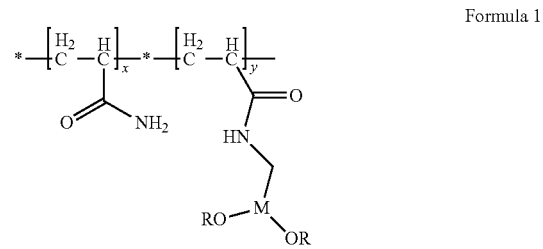

Formula 1 where x, and y are integers and M=Ti, Zr, Al, and Cr and R=$C_nH_{(n+2)}$ where n is an integer.

As mentioned above, the crosslinker is a copolymer synthesized from at least one monomer and an organic metal ligand. The monomer may be a water-soluble monomer containing a vinyl group including, but not limited to an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof.

Reactive Organometallic Monomers

The reactive organometallic monomers may include at least one metal-carbon bond and one reactive group. They may be constructed from a metal ions or clusters bridged by organic ligands with one reactive group which can be copolymerized with acrylamide or any other selected group of polymers. Those reactive organometallic monomers known in the art may include vinylic metal compounds where the metal is selected from Ti, Zr, Al, Cr and mixtures thereof.

In an embodiment, the vinylic metal compounds have the following formula:

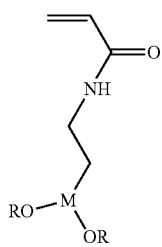

Formula 2 where M=Ti, Zr, Al, and Cr and R=$C_nH_{(n+2)}$.

In another embodiment, the vinylic metal compounds may have the following formula:

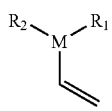

Formula 3 where M=Ti, Zr, Al, and Cr and $R_1$, $R_2$=Cl, Br, $OCH_3$.

In one embodiment, the vinylic metal compound may be at least one of vinylaluminum dichloride, vinylaluminum dibromide, vinylaluminum dimethoxide, and mixtures thereof. Vinylic compounds and methods of synthesizing them are described in U.S. Pat. No. 3,010,985.

Conventional methods for synthesizing interpenetrating copolymers can form gradient copolymers in which the monomer units are clustered in less than the whole length of the polymer chain. As used herein, the term "gradient copolymer" will refer to a copolymer in which there is a block or random distribution of at least two monomer units in a copolymer, wherein at least one of the monomer units is not substantially distributed over the whole length of the polymer chain. Gradient copolymers can also be referred to as "blocky copolymers," since at least one of their monomer units is clustered in a block within the polymer chain, sometimes in combination with other monomer units, while other blocks within the polymer chain are substantially free of the monomer unit. It should be understood that within the block containing the monomer unit of interest, its distribution can be random or ordered. That is, the term "gradient copolymer" does not imply any particular degree of order in the monomer units.

If the interpenetrating copolymers could be prepared such that gradient copolymer formation is eliminated, minimized or reduced relative to conventional synthetic techniques, lower concentrations of these crosslinking agents could be used in a treatment fluid for a given polymer molecular weight to obtain comparable crosslinking effects. That is, for a copolymer having a like number of monomer units, a copolymer having a lower molecular weight could produce a similar gelling effect to a higher molecular weight polymer having more non-crosslinkable monomer units. The opportunity to use lower concentrations of the crosslinking agents in a treatment fluid can advantageously lead to lessened environmental effects.

In addition to the opportunity to use lower concentrations of crosslinking agent, it is also believed that the interpenetrating copolymers can also allow lower concentrations of gelling agent to be used in a treatment fluid to achieve efficient gelling. The opportunity to use lower concentrations of the gelling agent can also provide lessened environmental effects. For example, in some embodiments, a gelling agent present below its critical overlap concentration C* can be effectively crosslinked using an interpenetrating copolymer.

The opportunity to use lesser concentrations of gelling agent can also be advantageous in terms of material costs. In particular, in some embodiments, interpenetrating copolymers can be especially effective when crosslinked with guar and other polysaccharides a treatment fluid. As the cost of guar has significantly increased in recent years, it would be advantageous to use reduced quantities of this gelling agent in order to achieve suitable crosslinking results at a tower material cost. In this regard, it is expected that there will continue to be supply shortages of this biopolymer due to ongoing weather-related reductions in biomass growth. Further, the use of lower quantities of gelling agent can result in more facile formation cleanup and better regained conductivity.

In some embodiments, the interpenetrating polymer crosslinking agent can comprise a copolymer that comprises at least one reactive organometallic monomer and at least one water-soluble monomer unit. In some embodiments, the interpenetrating polymer crosslinking agent can comprise a random copolymer of at least one reactive organometallic monomer unit and at least one water-soluble monomer unit. In some embodiments, the interpenetrating polymer crosslinking agent can comprise a copolymer that is a gradient copolymer. Formula 3 shows a structure of an illustrative but non-limiting gradient copolymer containing monomer units A and B. According to the several embodiments, an interpenetrating polymer crosslinking agent synthesized according to conventional techniques would have a structure related to that of Formula 4, where A represents a monomer unit comprising reactive organometallic monomer functionality. The formation of a gradient copolymer such as that shown in Formula 4 can result from a faster reaction rate of one monomer compared to the other. In the case of Formula 4, monomer unit A (the reactive organometallic monomer) has a much faster reaction rate than monomer B, such that the interior portion of the polymer chain is dominated by monomer A and the termini of the polymer chain is dominated by monomer B.

-BBBBBBBBBBBBBB-
   BAABAAAABAABAAAABBBBBBB-
      BBBBBBBB-      Formula 4

In some embodiments, the interpenetrating polymer crosslinking agent can comprise a copolymer that is not a gradient copolymer. An illustrative but non-limiting non-gradient copolymer can have a structure shown in Formula 5 below, where A presents a monomer unit comprising reactive organometallic monomer functionality. In some embodiments, the interpenetrating polymer crosslinking agent can comprise a copolymer that has less gradient copolymer character than a comparable copolymer produced by conventional synthetic techniques. For example, an interpenetrating polymer crosslinking agent having less gradient copolymer character might have only about 5 B monomer units on its chain termini, as compared to 15 B monomer units in Formula 4.

-BABBBBAABBBBBBABBBABAABABBBBAB-
  BABBA-BBBABBBABB- Formula 5

In various embodiments, the copolymers and block copolymers of Formulas 1 through 5 can have an average molecular weight between about 1,000 Daltons and about 2,000,000 Daltons. For the interpenetrating polymer crosslinking agents having the general structures as shown in Formula 1, the monomers within the polymer structure can be any suitable monomers that result in a water-soluble polymer molecule and do not interfere with the crosslinking of the metal group with a gelling agent. In an exemplary embodiment, the ratio of A to B may range from about 1:1 to about 1:200.

Conventionally produced interpenetrating polymer crosslinking agents can be synthesized by combining at least one monomer unit with a vinyl group and at least one reactive organometallic monomer and allowing polymerization to occur by methods known to those of skill in the art. Illustrative examples may include, free radical polymerization, click chemistry, and controlled radical polymerization. The resulting copolymers may be brush, comb, random, or block copolymer systems. The free radical polymerization type of synthesis can lead to gradient copolymer formation. At elevated pH values, conventional free radical-induced chain polymerizations may not run effectively, and oftentimes highly reactive hydroxyl radicals can be formed. In addition, under such conditions, reactive organometallic monomer units can react more rapidly than do other monomer units, thereby facilitating gradient copolymer formation. As a further difficulty, emulsions obtained from such high pH polymerizations can be difficult to invert into purely aqueous-based systems.

In some embodiments, the amount of crosslinker is in the range of about 0.05 pounds per thousand gallons of treatment fluid to about 85 pounds per thousand gallons of treatment fluid.

Tuning Treatment System

The well treatment system including the treatment fluid comprising an aqueous fluid, a gelling agent; and a crosslinker comprising a copolymer including an interpenetrating monomer with organic bound metal ions, may be tuned in several ways to adapt the fluid to specific conditions in a wellbore. At least one of the following methods may be utilized: the degree of substitution may be varied on the metal copolymers; the degree of substitution may be varied on the gelling agent; the amount of metal on the crosslinking copolymer may be varied; the shape of the crosslinking copolymer may be varied; and the distribution of metal on the polymer may be varied; the molecular weights of the metal copolymers may be varied; and combinations thereof. Each of these methods is known by those of skill in the art. In an exemplary example, the ratio of polymeric crosslinker to CMC/guar can range from about 1:1 to about 1:10, about 1:1 to about 1:4, about 1:1 to about 1:2.

Encapsulating Compounds

In the present invention, the crosslinkers may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like. Suitable materials may also include phenyl formaldehyde, lactone styrene derivatives, and combinations thereof. Using encapsulated well treatment chemicals permits blending of normally incompatible compounds in the treatment fluid. A non-limiting list of mechanisms suitable for releasing the encapsulated crosslinkers includes: a change in pH, crushing, rupture, dissolution of the membrane, diffusion and/or thermal melting of the encapsulating membrane. Following placement of the compounds downhole, the crosslinkers are then released from the capsules and allowed to react. The controlled downhole release of the crosslinkers may improve their functionality.

Capsules of the present invention may have any shape, including but not limited to particles having the physical shape of rods, strips, spheroids, toroids, pellets, tablets, or any other physical shape. One of ordinary skill in the art with the benefit of this disclosure will recognize the specific degradable material and the preferred size and shape for a given application.

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions. Particulates as used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand). A particulate will have a particle size distribution ("PSD"). As used herein, "the size" of a particulate can be determined by methods known to persons skilled in the art.

Formation Treatment

During a remedial or primary treatment, a proppant pack may be formed in a treatment zone before the fracturing stage of the process. A proppant pack may also be formed during the fracturing stage. If the proppant pack is formed before the fracturing stage, the treatment zone was previously fractured and a proppant pack was previously placed in the fracture complexity. Accordingly, the methods according to the invention can be adapted for remedial or primary fracturing of a treatment zone.

Gravel Packing Operation

When used in conjunction with gravel packing operations, gravel packing fluids (i.e., a treatment fluid) comprising an aqueous base fluid, gravel, a gelling agent and an interpenetrating polymer crosslinking agent can be placed in or near a portion of a subterranean formation so as to create a gravel pack. After the gravel pack is substantially in place, the viscosity of the gravel packing fluid can be reduced to a desired degree and recovered.

Fracturing Process

When used in conjunction with fracturing operations, fracturing fluids (i.e., a treatment fluid) comprising an aqueous base fluid, a gelling agent and an interpenetrating polymer crosslinking agent can be introduced into a subterranean formation at a pressure sufficient to create or enhance at least one fracture therein. Proppant particulates can also be included. After the fracturing fluid has performed its desired function, or after a desired time has passed, the viscosity of the fracturing fluid can be reduced and the fluid recovered.

Delinking Procedure

In some applications, after a viscosified treatment fluid has performed its desired function, its viscosity may be reduced. For example, in a subterranean application, once the viscosified treatment fluid's viscosity has been reduced, it can be flowed back to the surface, and the well can be returned to production. Reducing the viscosity of a viscosified treatment fluid can occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules).

Although crosslinks between gelling agent molecules and the interpenetrating polymer crosslinking agents can be delinked by changing the pH, any breaker can be used with the viscosified treatment fluids of the present invention. The term "breaker" refers to an agent that is capable of reducing the viscosity of a treatment fluid. For example, any breaker that is an acid, oxidizer, or enzyme known in the art can be used with the treatment fluids of the present invention. Suitable acid breakers can include mineral acids such as, for example, hydrochloric acid, sulfuric acid, or nitric acid. Suitable oxidizers can include, for example, persulfates, peroxides, and hypochlorites. In some embodiments, the breaker can be a delayed breaker such as a delayed release acid capable of lowering the pH of the treating fluid. Examples of delayed breakers which can be used include, but are not limited to, various lactones, esters, encapsulated acids and slowly soluble acid generating compounds, oxidizers which produce acids upon reaction with water, water reactive metals such as aluminum, lithium and magnesium and the like. The breaker can be included in the treatment fluid in an amount ranging from about 0% to about 1% by weight of the aqueous fluid therein. Enzyme breakers capable of generating acids can also be employed including, for example, alpha and beta amylases, amyloglucosidase, invertase, maltase, cellulose and hemi-cellulase. The specific delayed breaker used, whether or not it is encapsulated, as well as the amount thereof employed can depend upon the breaking time desired, the nature of the gelling agent and the interpenetrating polymer crosslinking agent, subterranean formation characteristics and conditions and other factors.

The present invention also provides methods of reusing treatment fluids or any component, or combination of components, therein. In general, the treatment fluids of the present invention can be reused because gelling agents crosslinked using the interpenetrating polymer crosslinking agents can be delinked. In certain embodiments, reuse of the treatment fluids of the present invention can involve delinking the gelling agents to a sufficient degree so as to remove the crosslinks to at least one gelling agent molecule thereby forming a "delinked gelling agent." These delinked gelling, agents can then be crosslinked again (e.g., to increase the viscosity of the same or a different treatment fluid). In certain embodiments, one or more components of a treatment fluid comprising delinked gelling agents can be reused. For example, the gelling agent or the water of a viscosified treatment fluid may be reused. Reusing viscosified treatment fluids is described U.S. Pat. No. 7,082,995.

In some embodiments, methods of treating a subterranean formation can comprise providing a treatment fluid comprising: an aqueous base fluid, a gelling agent, and an interpenetrating polymer crosslinking agent; and introducing the viscosified fluid into a subterranean formation. In some embodiments, the treatment fluid can be contacted with a breaker, and the viscosity of the treatment fluid can be allowed to decrease. The treatment fluid can then be re-crosslinked to increase the viscosity of the treatment fluid as desired.

In another embodiment, the treatment fluid can be used for a fracturing operation. A method of fracturing a subterranean formation can comprise providing a treatment fluid comprising: an aqueous base fluid; a gelling agent; and an interpenetrating polymer crosslinking agent; and introducing the treatment fluid into a subterranean formation at a pressure sufficient to create or enhance at least one fracture within the subterranean formation. In some embodiments, the treatment fluid can be contacted with a breaker, and the viscosity of the treatment fluid can be allowed to decrease. The treatment fluid can then be re-crosslinked to increase the viscosity of the treatment fluid as desired.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

pH Adjusting Materials

The treatment fluids of the present invention also may comprise pH-adjusting agents. The pH-adjusting agents can be included in the treatment fluids to adjust the pH of the treatment fluids, inter alia, to facilitate the formation or delinking of crosslinks between gelling agent molecules. In some embodiments, polymeric organometallic crosslinking agents may not be capable of forming crosslinks between gelling agent molecules in acidic environments (e.g., at or below a pH ranging from about 6.0 to 7.0). Therefore, crosslinking or delinking can occur by adjusting the pH of the treatment fluid once it is placed in a desired location (e.g., in a well bore penetrating a subterranean formation). In certain embodiments in which the pH is to be increased (e.g., to facilitate crosslinking), suitable pH-adjusting agents can comprise a base. Examples of suitable bases can include, but are not limited to, sodium hydroxide, potassium hydroxide, lithium hydroxide, sodium carbonate, potassium carbonate, ammonium hydroxide or a combination thereof. In other embodiments in which the pH is to be decreased (e.g., to facilitate delinking), suitable pH-adjusting agents can include, but are not limited to, fumaric acid, formic acid, acetic acid, acetic anhydride, hydrochloric acid, sulfuric acid, hydrofluoric acid, hydroxyfluoroboric acid, polyaspartic acid, polysuccinimide, or a combination thereof. The identity and amount of the pH-adjusting agent can depend on, for example, the subterranean formation characteristics and conditions, the breaking or crosslinking time desired, and the nature of the interpenetrating polymer crosslinking agent.

Buffers

In addition, the treatment fluids of the present invention can further comprise a buffer. Buffers can be used to maintain a treatment fluid's pH in a limited range. Examples of suitable buffers can include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, and the like. When used, the buffer can be included in an amount sufficient to maintain the pH of the treatment fluids at a desired level. In an embodiment, a buffer can be included in an amount ranging between about 0.5% to about 10% by weight of the aqueous fluid therein. One of ordinary skill in the art, with the benefit of this disclosure, will recognize the appropriate buffer and amount to use for a chosen application.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable stimulation treatments where a treatment fluid of the present invention may be suitable. Other potential applications of this resin system, with some minor adjustments such as modifying the dilution factor with the carrier fluid or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the treatment fluid is placed into a wellbore as a single stream and activated by downhole conditions to form new channels or gaps in fracture faces.

In an embodiment, the treatment fluid may be introduced into the wellbore, the formation, or a lost circulation zone as a single pill fluid. That is, in such an embodiment, all components of the treatment fluid may be mixed and introduced into the wellbore as a single composition. In an alternative embodiment, the treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the treatment fluid components may be achieved by introducing the components within a single flowpath, but being separated by a spacer. Such a spacer may comprise a highly viscous fluid which substantially or entirely prevents the intermingling of the treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation. In wells penetrating certain formations, it is often desirable to create relatively small fractures referred to in the art as "microfractures" in the formations near the wellbores to facilitate creation of hydraulically induced enlarged fractures.

The substance of a "gel" is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

In various embodiments, systems configured for delivering the treatment fluids described herein to a downhole location are described. In various embodiments, the systems can comprise a pump fluidly coupled to a tubular, the tubular containing the hydrolysable acid, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for carrier downhole.

Figure 7:
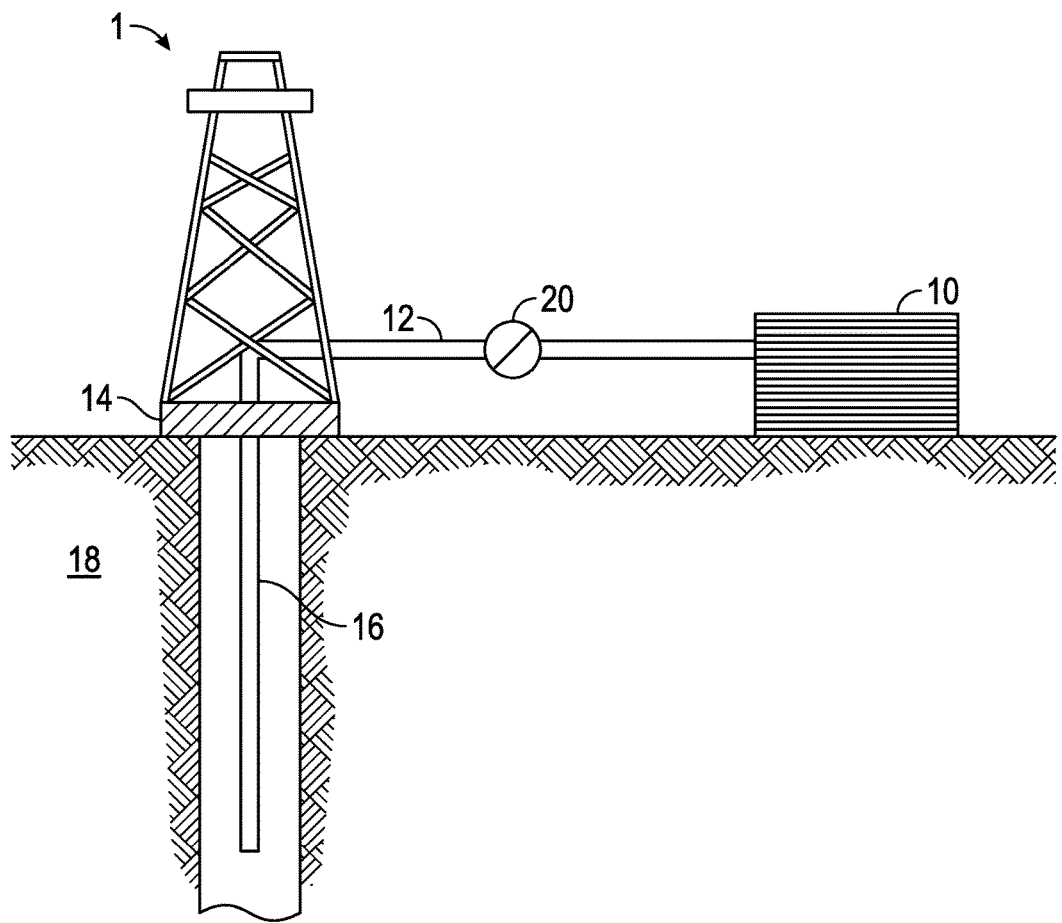
FIG. 7 depicts an embodiment of a system configured for delivering the encapsulated acid compositions comprising treatment fluids of the embodiments described herein to a downhole location.

FIG. 7 shows an illustrative schematic of a system that can deliver treatment fluids of the embodiments disclosed herein to a downhole location, according to one or more embodiments. It should be noted that while FIG. 7 generally depicts a land-based system, it is to be recognized that like systems may be operated in subsea locations as well. As depicted in FIG. 7, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 7 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 7, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 7.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

An example of a fluid system according to the invention may include:

Mixing of 5 pptg (pounds per thousand gallons) CMC with 5 pptg polymeric metal

An additional example of a fluid system may include:

Mixing 8 pptg CMC with 2 pptg polymeric metal

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method of treating a subterranean formation, comprising: introducing a viscosified treatment fluid into a subterranean formation, said treatment fluid comprising: an aqueous fluid; a gelling agent; and a crosslinker comprising a copolymer including an interpenetrating monomer and organic bound metal ions.

B: A method of treating a subterranean formation, comprising: introducing a treatment fluid into a subterranean formation at a pressure sufficient to create or enhance at least one fracture within the subterranean formation, said treatment fluid comprising: an aqueous fluid; a gelling agent; and a crosslinker comprising a copolymer including an interpenetrating monomer and organic bound metal ions.

C: A composition comprising: an aqueous fluid; a gelling agent; and a crosslinker comprising a copolymer including an interpenetrating monomer and organic bound metal ions.

D: A well treatment system comprising: an apparatus configured to introduce a treatment fluid into a subterranean formation at a pressure sufficient to create or enhance at least one fracture within the subterranean formation, said treatment fluid comprising: an aqueous fluid; a gelling agent; and a crosslinker comprising a copolymer including an interpenetrating monomer with organic bound metal ions; introducing the treatment fluid into the subterranean formation; and creating or enhancing at least one fracture within the subterranean formation.

Each of embodiments A, B, C, and D may have one or more of the following additional elements in any combination: Element 1: wherein the crosslinker comprises reactive metal ion sites bound to the interpenetrating monomer through direct organic bonds. Element 2: wherein the crosslinker is a copolymer synthesized from at least one monomer including a vinyl group, and a reactive organometallic monomer. Element 3: wherein the at least one monomer is selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof. Element 4: wherein the reactive organometallic monomer comprises at least one metal-carbon bond and one reactive group. Element 5: wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof. Element 6: wherein the crosslinker copolymer is prepared by polymerization of a reactive organometallic monomer capable of polymerizing with at least one monomer selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof. Element 7: wherein the amount of crosslinker is in the range of about 0.05 pounds per thousand gallons of treatment fluid to about 85 pounds per thousand gallons of treatment fluid. Element 8: wherein the wherein the crosslinker is encapsulated to delay the release of the crosslinker. Element 9: further comprising shearing the viscosified treatment fluid; allowing the viscosity of the fluid to decrease; and re-crosslinking the fluid to increase the viscosity of the treatment fluid. Element 10: further comprising contacting the treatment fluid with a breaker and allowing the viscosity of the fluid to decrease. Element 11: wherein the treatment fluid further comprises a proppant particulate. Element 12: wherein the gelling agent is present in the treatment fluid in the range of from about 0.1% to about 10% by weight of the aqueous fluid.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating a subterranean formation, comprising:
    providing a fluid comprising:
        an aqueous fluid;
        a gelling agent; and
        a copolymer crosslinker comprising an organometallic monomer and a monomer comprising a vinyl group, wherein the organometallic monomer comprises a metal selected from the group consisting of aluminum, antimony, zirconium, magnesium, titanium, chromium, and combinations thereof;
    crosslinking the gelling agent with the copolymer crosslinker to form a treatment fluid; and
    introducing the treatment fluid into a subterranean formation;
    wherein the copolymer crosslinker has one of Structure 1 or Structure 2:

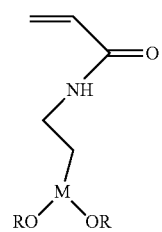

Structure 1

-continued

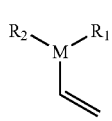
Structure 2 wherein in Structure 1, M is the selected metal and R is $C_nH_{(n+2)}$, where n is an integer; and
wherein in Structure 2, M is the selected metal and $R_1$ and $R_2$ are each selected from Cl, Br or $OCH_3$.

2. The method of claim 1, wherein the monomer comprising a vinyl group is selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylfoiinamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof.

3. The method of claim 1, wherein the organometallic monomer comprises at least one metal-carbon bond and one reactive group capable of polymerization.

4. The method of claim 1, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof.

5. The method of claim 1, wherein the copolymer crosslinker is prepared by polymerization of the organometallic monomer and the monomer comprising a vinyl group, wherein the monomer comprising a vinyl group is selected from the group consisting of:
an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof.

6. The method of claim 5, wherein the crosslinker is encapsulated.

7. The method of claim 1, wherein the amount of the copolymer crosslinker is in the range of about 0.05 pounds per thousand gallons of treatment fluid to about 85 pounds per thousand gallons of treatment fluid.

8. The method of claim 1, further comprising:
crosslinking the copolymer crosslinker and the gelling agent to form a viscosified treatment fluid;
shearing the viscosified treatment fluid;
allowing a viscosity of the viscosified treatment fluid to decrease; and
re-crosslinking the viscosified treatment fluid to increase the viscosity of the viscosified treatment fluid.

9. A method of treating a subterranean formation, comprising:
providing a fluid comprising:
an aqueous fluid;
a gelling agent; and
a copolymer crosslinker comprising an organometallic monomer and a monomer comprising a vinyl group, wherein the organometallic monomer comprises a metal selected from the group consisting of aluminum, antimony, zirconium, magnesium, titanium, chromium, and combinations thereof;
crosslinking the gelling agent with the copolymer crosslinker to form a treatment fluid; and
introducing the treatment fluid into a subterranean formation at a pressure sufficient to create or enhance at least one fracture within the subterranean formation;
wherein the copolymer crosslinker has one of Structure 1 or Structure 2:

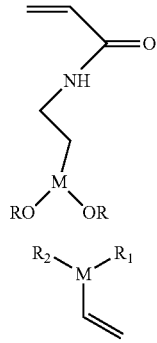

wherein in Structure 1, M is the selected metal and R is $C_nH_{(n+2)}$, where n is an integer; and
wherein in Structure 2, M is the selected metal and $R_1$ and $R_2$ are each selected from Cl, Br or $OCH_3$.

10. The method of claim 9, wherein the monomer comprising a vinyl group is selected from the group consisting of: an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivatives of acrylamide, a quaternary salt derivatives of acrylic acid, an alkyl acrylates, an alkyl methacrylates, an alkyl acrylamides, an alkyl methacrylamides alkyl dimethylammoniumethyl methacrylate halide, an alkyl dimethylammoniumpropyl methacrylamide halide, any derivative thereof, and any combination thereof.

11. The method of claim 9, wherein the gelling agent comprises a polymer selected from the group consisting of a polysaccharide, a guar, hydroxypropyl guar, carboxymethylhydroxypropyl guar, a polyvinyl alcohol, a cellulose, a xanthan, hydroxyethyl cellulose, carboxymethyl cellulose, carboxyethyl cellulose, any derivative thereof, and any combination thereof.

12. The method of claim 9, further comprising contacting the treatment fluid with a breaker; and allowing a viscosity of the fluid to decrease.

13. The method of claim 9, wherein the amount of copolymer crosslinker is in the range of about 0.05 pounds per thousand gallons of treatment fluid to about 85 pounds per thousand gallons of treatment fluid.

14. The method of claim 9, wherein the treatment fluid further comprises a proppant particulate.

15. A well treatment system comprising:
an apparatus configured to introduce a treatment fluid into a subterranean formation at a pressure sufficient to create or enhance at least one fracture within the subterranean formation, said treatment fluid comprising:
an aqueous fluid;
a gelling agent; and
a copolymer crosslinker comprising an organometallic monomer and a monomer comprising a vinyl group, wherein the organometallic monomer comprises a metal selected from the group consisting of aluminum, antimony, zirconium, magnesium, titanium, chromium, and combinations thereof;
crosslinking the gelling agent with the copolymer crosslinker;
introducing the treatment fluid into the subterranean formation; and
creating or enhancing at least one fracture within the subterranean formation;
wherein the copolymer crosslinker has one of Structure 1 or Structure 2:

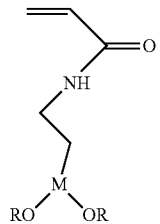

Structure 1

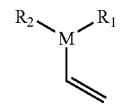

Structure 2 wherein in Structure 1, M is the selected metal and R is $C_nH_{(n+2)}$, where n is an integer; and wherein in Structure 2, M is the selected metal and $R_1$ and $R_2$ are each selected from Cl, Br or $OCH_3$.

* * * * *